June 10, 1958 — R. C. CASSELMAN — 2,837,852
PHOTOGRAPHIC TRANSPARENCY MOUNT
Filed Sept. 29, 1955 — 2 Sheets-Sheet 1
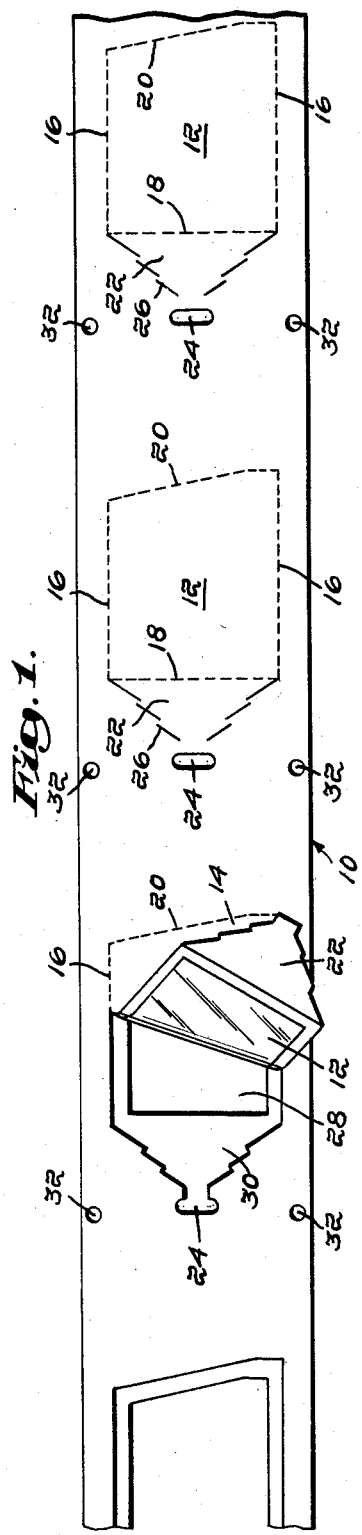
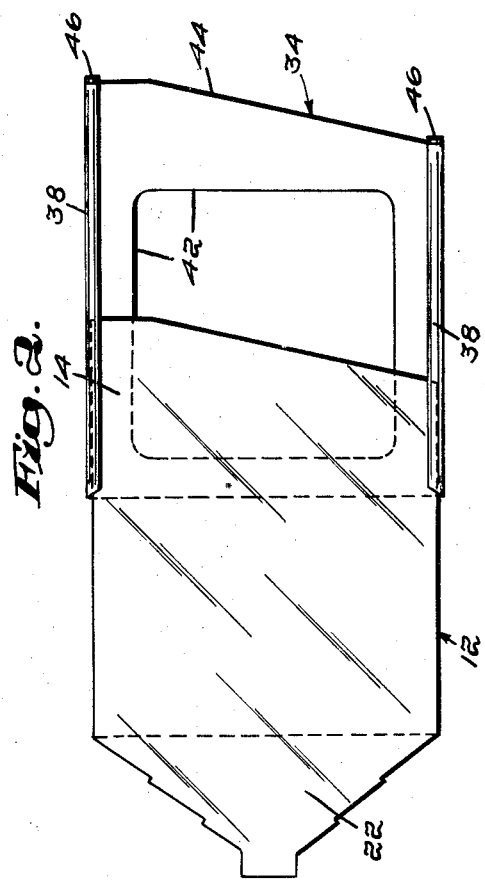
Inventor:
Robert C. Casselman
by Brown and Mikulka
and Robert E. Corb
Attorneys June 10, 1958 R. C. CASSELMAN 2,837,852
PHOTOGRAPHIC TRANSPARENCY MOUNT
Filed Sept. 29, 1955 2 Sheets-Sheet 2
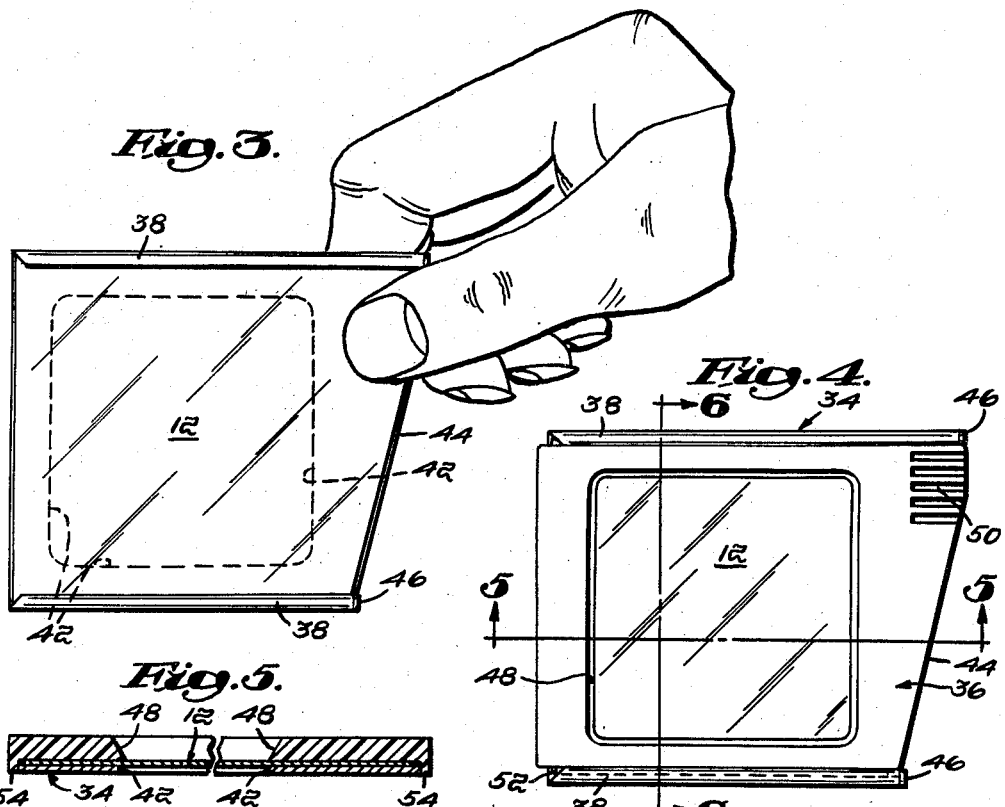
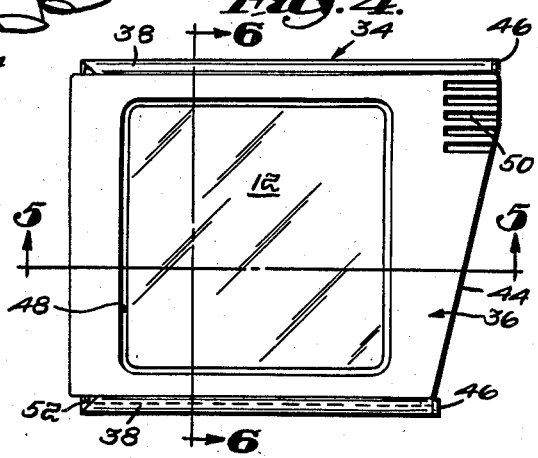
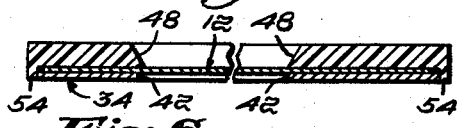
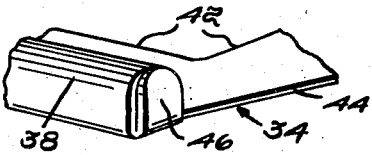
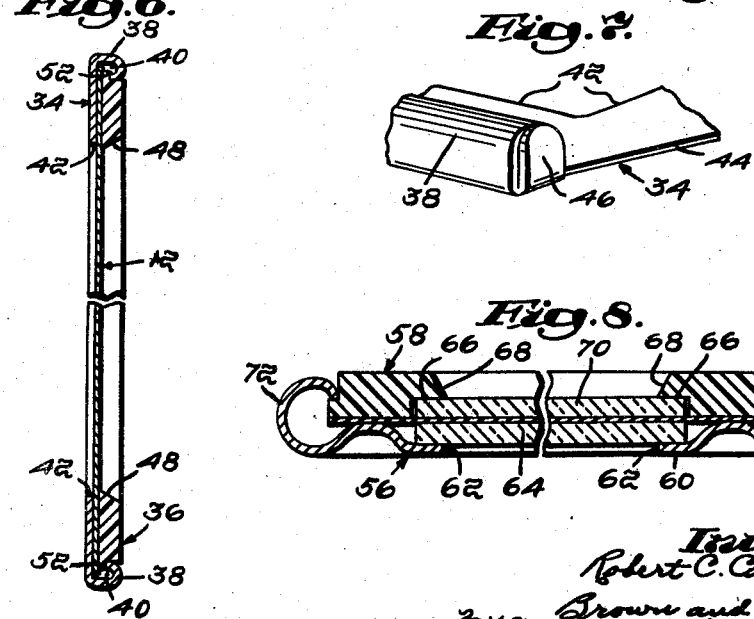

United States Patent Office 2,837,852
Patented June 10, 1958

2,837,852

PHOTOGRAPHIC TRANSPARENCY MOUNT

Robert C. Casselman, Auburndale, Mass., assignor to Polaroid Corporation, Cambridge, Mass., a corporation of Delaware Application September 29, 1955, Serial No. 537,424

12 Claims. (Cl. 40—152)

This invention relates to a mount for a photographic transparency.

It is well known that positive photographic transparencies suitable for projection or viewing may be produced directly from a latent image on a photosensitized surface by diffusion transfer-reversal in the camera in which exposure of the photosensitized surface was made. The production of such transparencies is disclosed in Patent No. 2,543,181, issued to Edwin H. Land on February 27, 1951, and a camera of the type adapted to the direct production of a photographic transparency is described in Patent No. 2,435,717, granted to Edwin H. Land on February 10, 1948, and in Patent No. 2,455,111, granted to J. F. Carbone et al. on November 30, 1948. It is desirable, following production of a transparency, to immediately give the transparency a protective treatment and to mount the transparency so as to prevent any physical harm thereto and to facilitate storage and handling.

An object of the invention is to provide a novel mount or holder for a photographic transparency of the above type which is simple and inexpensive to fabricate, convenient to use and facilitates the protective treatment of the transparency.

A further object of the invention is to provide a photographic transparency of the type described which is asymmetric in shape, together with a similarly asymmetric holder or mount for said transparency, the asymmetry of the transparency and mount facilitating the treatment and mounting of said transparency.

Other objects of the invention will in part be obvious and will in part appear hereinafter.

The invention accordingly comprises the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings wherein:

Figure 1 is a diagrammatic, schematic plan view of the outer surface of an image-carrying transparent sheet illustrating the stripping of a positive photographic transparency from a photosensitized sheet with which it is superposed during formation of the positive image;

Fig. 2 is a plan view illustrating the method of positioning a photographic transparency in one component of a mount in preparation for protectively treating said transparency and securing it within said mount;

Fig. 3 is a perspective view of a transparency positioned for protective treatment within the component of the mount of Fig. 2 illustrating the manipulation of the mount whereby protective treatment of the transparency is facilitated;

Fig. 4 is a plan view showing a transparency mounted in accordance with the invention;

Fig. 5 is a longitudinal cross-sectional view, somewhat enlarged, taken along the line 5—5 of Fig. 4;

Fig. 6 is a transverse cross-sectional view, somewhat enlarged, taken along the line 6—6 of Fig. 4;

Fig. 7 is a fragmentary perspective view, greatly enlarged, showing in detail a segment of the mount of Fig. 2; and Fig. 8 is a transverse cross-sectional view, similar to Fig. 6, of another embodiment of the invention.

The invention primarily relates to a novel mount for a positive photographic transparency, produced by one of the transfer processes now well known in the art, for projection and viewing said transparency. The transparency comprises an area of predetermined configuration of a larger image-receptive sheet and is simultaneously separated from the remainder of said sheet and stripped from a photosensitive sheet with which it was superposed during formation of the positive image. It is important not only that the transparency be mounted in a rigid frame or mount to form a slide but that the image surface of the transparency be given a protective treatment as one step in the preparation of the transparency for viewing or projection. The holder or mount of the invention is one which is not only simple and inexpensive to fabricate, convenient and easy to use, but is especially adapted by virtue of its particularly novel construction to facilitate the protective treatment of the transparency and to assure proper assemblage of an attractive and sturdy slide suitable for projection and viewing.

The present invention contemplates the employment of an image-receiving sheet, for example an image-receiving sheet in which a positive photographic print is obtained by a silver halide diffusion transfer-reversal process in a predeterminedly shaped image area of said sheet, said image area comprising the transparency to be mounted. The image area is torn or otherwise separated from the remainder of the sheet while being stripped from a second or photosensitive sheet with which it is superposed during processing, and is inserted into and retained in the mount. The image-receptive sheet is formed of any of the transparent flexible materials commonly used as a base for photographic film, such as cellulose acetate, cellulose nitrate or the like, and is generally of the type described in Patent No. 2,579,587, issued December 25, 1951, to Edwin H. Land, and Patent No. 2,612,452, issued September 30, 1952, to William J. McCune, Jr. These patents describe a double roll product comprising a first roll of photosensitive sheet and a second roll of an image-receiving sheet. These two rolls are particularly adapted to be separately mounted in a camera so as to permit exposure of a photosensitive layer carried by the roll of photosensitive sheet and advancement of the exposed area into superposition with an image area of the image-receiving sheet. The image-receiving sheet preferably includes a plurality of liquid-carrying containers, there being one container for each image area so that processing liquid can be released from each container and spread between the two superposed sheets. Spreading of this liquid laminates the two sheets together and accomplishes a predetermined processing, for example a silver halide diffusion transfer-reversal process, whereby a positive visible image is produced in the image area of the image-receiving sheet from the latent image in the area of the photosensitive layer superposed therewith. At the completion of such a processing, it is desried to separate the positive image area from the lamination to permit viewing of the positive image, it being preferable to maintain the other portions of the two laminated sheets in contact so that they confine therebetween any excess of the processing liquid.

Reference is now made to the drawings wherein there is shown one embodiment of an image-receiving sheet designated at 10 and illustrating the arrangement of separable positive image sections 12. Sheet 10 comprises, preferably, a plurality of rectangularly positive image areas each located in an image section 12 defined by perforations completely surrounding the image area, the unperforated portions of the sheet along the edges of the image section serving to keep the image section attached to the remainder of the image-receiving sheet 10. Each image section 12 is asymmetric in shape so as to provide a uniform margin around three sides of the rectangular image area and a margin along the fourth side which is generally triangular, diverging to an enlarged corner section 14 by which the transparency may be manually grasped without contacting the image. The longitudinal parallel lines of perforations are indicated at 16, one transverse line of perforations at 18, and the other transverse line of perforations defining the divergent margin is angular and indicated at 20 with the minor portion of line 20 adjacent corner section 14 being generally parallel with line 18 and the remainder of line 20 being inclined inwardly toward the image area of transparency 12.

Adjacent one end of each image section 12, there is provided a generally triangular initial tear-out portion 22 which is defined by an initial tear-out hole 24 and a pair of oblique lines of perforations 26 which preferably extend from adjacent corners of the image section to the vicinity of tear-out hole 24. In another form of image-receiving sheet 10, initial tear-out portions 22 may be omitted, corner sections 14 being utilized for grasping and tearing out image sections 12, and a suitable tear-out hole may be provided in association with each corner section 14. On that surface of image-receiving sheet 10 which is brought into superposed relation with the exposed photosensitive sheet indicated at 28 there is preferably provided a mask 30 having edges defining a rectangular aperture, this aperture defining the area of sheet 10 which is to receive the positive image produced by the aforementioned transfer process. As shown in Fig. 1, this aperture which defines the image area is slightly smaller than image section 12 defined by lines of perforations 16, 18 and 20, thereby providing a border for the positive image formed in section 12. The processing liquid is spread between photosensitive sheet 28 and mask 30 so that the mask is laminated by the layer of liquid to the photosensitive sheet and is caused to remain secured to the photosensitive sheet between the latter and the remaining sections of sheet 10 as an image section is stripped from the photosensitive sheet.

The separation or stripping operation is illustrated in Fig. 1 wherein one image section 12 is shown as being partially torn out. Tearing of the image section is accomplished by inserting a fingernail, for example of the left hand, through the initial tear-out hole 24 and separating initial tear-out portion 22 from sheet 10 along lines of perforations 26. Continued pulling in a direction from left to right ruptures the unperforated portions along the two longitudinal lines 16 at the edges of section 12 and continues until transverse line of perforations 20 is reached. To mount the transparency, the operator, while still grasping the image section 12 by tear-out portion 22, merely turns the image section or transparency over and inserts it into the mount of the invention in the manner hereinafter described without contacting the surface of the actual image area, the particular asymmetric shape of the image section or transparency being such as to insure positioning of the transparency with the image surface uppermost.

The transparency mount, in the form shown in Figs. 2 through 7, comprises two elements, a framelike holder or mounting element 34 and a retaining frame 36. Holder 34, formed preferably of a flexible sheet material such as sheet metal, is generally asymmetric in shape, conforming substantially to the shape of the transparency as hereinbefore described, and being generally coextensive therewith. The longitudinal sides of holder 34 are substantially parallel with one another and the edge sections 38 are rolled or overturned to form a pair of channels 40 extending substantially the full length of the holder. Holder 34 is provided with an aperture 42, preferably square and corresponding to the image formed in a transparency 12 through which the transparency may be viewed when mounted.

A transparency or image section 12 is positioned in holder 34 and retained therein during protective treatment in the manner shown in Figs. 2 and 3. A transparency is positioned by inserting its lateral edges into the open ends of channels 40 and sliding the transparency with its edges so positioned toward one end of holder 34, that is, toward the end having the angular transverse edge indicated at 44. The transparency is moved in this direction until the edges of both the transparency and the holder substantially coincide, the transparency being preferably slightly smaller than the holder. By virtue of this arrangement of similar shapes, the operator is assured that the transparency is correctly positioned in the holder with the image surface facing him. As a means for assuring the insertion of the transparency in the correct direction (to the right as shown in the drawings), a pair of tabs 46 are turned up from the end of holder 34 at the corners where transverse edge 44 joins the lateral rolled edges of the holder. Tabs 46 are so formed as to close the ends of channels 40, thereby allowing the introduction of the edges of a transparency into the channels in only one direction and arresting the movement of the transparency toward edge 44 when it is properly positioned (see Fig. 3) for protective treatment.

Corner section 14 of the transparency, together with a corresponding section of holder 34 underlying section 14, provide an area at which the operator may grasp both the transparency and holder, for example between the thumb and forefinger as shown in Fig. 3, for retaining the transparency in the holder while initial tear-out portion 22 is torn from the transparency along line 18 and a protective coating is applied to the image surface.

Retaining frame 36 comprises a substantially flat element considerably thicker than the sheet material comprising holder 34 and is almost identically asymmetric in shape, being slightly longer and narrower than the holder, so that when the mount is assembled frame 36 fits between the channels formed by edge sections 38 and extends slightly beyond the ends of holder 34. Frame 36 is formed preferably of a plastic material, for example by molding, and includes an aperture 48 generally coextensive with aperture 42 in holder 34 and an enlarged corner section 50 corresponding to the corner section 14 of a transparency 12. Enlarged corner section 50 may be grooved as shown or provided with any other suitable surface configurations for aiding in gripping a slide formed by the mount and for aiding in identifying the front surface of the slide. The asymmetric shape of the finished slide additionally aids in assuring the correct positioning of the slide in a slide changer or holder of a projector or viewing device even when the slide is not visible to the operator.

To complete the mounting of a transparency 12 following application of a protective coating to the image surface thereof, retaining frame 36 is superposed with an image side of the transparency and secured between longitudinal rolled edge sections 38. For this purpose the longitudinal edges of frame 36 are provided with laterally projecting shoulders or flanges 52 adapted to project into channels 40 where they are retained. Frame 36 is positioned and secured in place merely by locating it between edge sections 38 and applying pressure to its front surface, causing flanges 52 to coact with the edge sections, deforming the latter sufficiently to permit flanges 52 to enter channels 40. The transparency 12, once positioned for coating, remains in the same position during both coating and assemblage of frame 36 into holder 34.

Correct longitudinal positioning of frame 36 with respect to holder 34 and prevention of longitudinal movement of a transparency between the frame and holder is assured by providing rearwardly extending shoulders or ribs 54 on the rear surface of frame 36 at the transverse edges thereof. Ribs 54 project rearwardly exterior of the transverse edges of both transparency 12 and holder 34, thereby preventing longitudinal movement of any of the elements with respect to one another. The thickness of frame 36 is such that when the frame and a holder 34 are assembled together with a transparency in the manner described to form a projection slide, the forward surfaces of rolled edge sections 38 are substantially flush with the forward surface of frame 36 with nothing projecting rearward beyond the rear surface of holder 34. The maximum thickness of the slide thus formed is substantially equal to the combined thickness of the sheet material comprising holder 34, the transparency 12 and frame 36 and the slide is free of outward projections.

Another embodiment of a transparency mount comprehended by the invention is shown in Fig. 8 and is adapted for mounting a transparency between a pair of transparent cover plates. This mount comprises a holder 56 and retaining frame 58 both of which are similar in general outline, construction and function to holder 34 and retaining frame 36, respectively, except that both include recessed sections for accommodating cover plates. Holder 56 includes a rectangular or preferably square recessed section 60 having an aperture 62 located therein, the recessed section being slightly larger than the aperture through which a transparency is visible, and is of a depth substantially equal to the thickness of a cover plate 64 formed of any suitable rigid transparent material such as glass or plastic. Retaining frame 58 includes a recess indicated at 66 substantially coextensive with recessed section 60 and an aperture 68 coextensive with aperture 62. Recess 66 is equal in depth to recessed section 60 and is adapted to accommodate another transparent cover plate 70 substantially identical with cover plate 64.

The particular construction of this form of transparency mount provides for the alternative assemblage of a projection slide either with or without transparent cover plates for the transparency. The slide may be assembled without cover plates on opposite sides of the transparency 12, the transparency being supported at its margins between the marginal sections of the holder and frame. Holder 56 includes longitudinal rolled edge sections 72, the forward and rear surfaces of which are substantially flush with the forward and rear surfaces, respectively, of frame 58 and holder 56, so that the finished slide is without exterior projections and is of substantially uniform maximum thickness throughout its width. Holder 56 is employed in the same manner as holder 34 to facilitate the application of a protective coating to a transparency and for mounting the transparency to form a slide.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A photographic product comprising a generally rectangular positive photographic transparency having a frame area surrounding the image area and an outwardly flared asymmetric edge providing an enlarged corner of the frame area, a mounting element having a framelike, substantially flat, inner supporting surface engaging said frame area of the transparency, a central aperture, an outwardly flared matching asymmetric edge providing an enlarged corner area, said matching asymmetric edges when aligned insuring that the image area of the transparency and the aperture of the mounting element are in register and that the image-carrying surface of the transparency is remote from said supporting surface of the mounting element and a pair of parallel channels formed at two opposed longitudinal edge portions of the mounting element and slidably receiving said transparency, a substantially rigid retaining plate of similar shape to said transparency and said mounting element engaged in said channels, said retaining plate having a framelike inner supporting surface engaging said frame area of the transparency, a central aperture, an outwardly flared asymmetric edge providing an enlarged corner area, said flared edge and enlarged corner area of the retaining plate when aligned with said asymmetric edges and enlarged areas of the transparency and mounting element providing correct register of the aperture of the retaining plate with that of the mounting element and with said image area and correct mounting of the transparency for exhibition purposes, said enlarged corner areas when superposed providing means for manually manipulating said product.

2. The photographic product of claim 1 wherein the mounting element is at least partially formed of a resilient material, wherein edge portions of said retaining plate engaged in said channels are in the form of flanges of reduced thickness, and wherein said mounting element, transparency and retaining plate are held at correct relative positions in frictional engagement.

3. The photographic product of claim 2 wherein turned over edges of said mounting element form said pair of channels and wherein the combined thicknesses of areas of said retaining plate and transparency intermediate said channels are substantially equal to that height of said channels which extends above the inner surface of said mounting element.

4. The photographic product of claim 2 wherein said retaining plate is of a greater length than that of said mounting element and comprises portions extending beyond the edge of said mounting element at the nonflared end thereof.

5. The photographic product of claim 4 wherein the inner surface of said portions of the retaining plate which extend beyond the edge of the mounting element are provided with a raised ridge projecting inwardly and serving as an engaging means for maintaining the relative longitudinal positions of said mounting element, transparency and retaining plate.

6. The photographic product of claim 2 wherein each of said channels of the mounting element comprises a closure at one end, said closures constituting limit stop means with respect to the slidable insertion of said transparency in said channels and providing alignment of said asymmetric edges.

7. A mount for a photographic transparency comprising, in combination, a supporting element and an interlocking retaining plate, said supporting element comprising a plurality of flat, connected, coplanar marginal areas comprising longitudinal marginal areas and end marginal areas connecting said longitudinal marginal areas providing a surface for supporting one face of said transparency, a pair of channel means comprising overturned edge portions of said longitudinal marginal areas extending substantially parallel with one another and projecting above the supporting surface of said marginal areas for slidably receiving said transparency and for engaging said supporting element, at least said longitudinal edge portions comprising said channel means being formed of a resilient material and the external height of said channel means above said supporting surface being greater than the internal spacing between said surface and said channel means, an aperture in said supporting element formed centrally of said marginal areas, a pair of turned-up tabs for closing the ends of said channel means at one extremity of said supporting element for locating an end edge of said transparency and for correctly positioning the image area of said transparency with respect to the central aperture of said supporting element, said retaining plate being formed of a substantially rigid material and comprising a plurality of connected, coplanar marginal areas corresponding to said marginal areas of said supporting element and including longitudinal marginal areas and end marginal areas connecting said longitudinal marginal areas providing a surface for supporting the opposite face of said transparency, said longitudinal marginal areas of said retaining plate having substantially parallel edges so spaced apart as to fit transversely between said channel means, an aperture formed in said retaining plate centrally of said marginal areas thereof in register with the aperture of said supporting element when said retaining plate is located between said channel means, longitudinal flanges projecting laterally from said longitudinal edges of said retaining plate and adapted to project into said channel means, said channel means being deformable outwardly from one another to permit introduction of said flanges into said channel means by pressing said retaining plate between said channel means toward said supporting element, the surfaces of said flanges which are adjacent said supporting element being coplanar with the supporting surface of said retaining plate, the thickness of said retaining plate with respect to that of said flanges and to the external height of said channel means being such as to place the exposed surface of said retaining plate approximately even with the top of said channel means.

8. The transparency mount of claim 7 wherein said retaining plate is of a greater length than that of said supporting element whereby at least one end edge portion of said retaining plate extends beyond an end edge of said supporting element, said end edge portion of said retaining plate including a raised ridge on its inner surface for engaging said end edge of said supporting element and maintaining the relative longitudinal positions of said supporting element, retaining plate and a transparency located therebetween.

9. The transparency mount of claim 8 wherein both end edge portions of said retaining plate extend beyond the end edges of said supporting element and include raised, inwardly projecting ridges for engaging the end edges of said supporting element, and maintaining the relative longitudinal positions of said supporting element, retaining plate and a transparency located therebetween.

10. A holder for use with an asymmetric photographic transparency having a given contour generally similar to that of said holder, said holder comprising a supporting element and an interlocking retaining plate, said supporting element comprising a plurality of flat, connected, coplanar marginal areas including longitudinal marginal areas and end marginal areas connecting said longitudinal marginal areas providing a surface for supporting one face of said transparency, at least one of said end marginal areas being angularly flared in the plane thereof to provide an enlarged marginal area, a pair of channel means comprising overturned edge portions of said longitudinal marginal areas extending substantially parallel with one another and projecting above the supporting surface of said marginal areas, at least said longitudinal edge portions comprising said channel means being formed of a resilient material, an aperture in said supporting element formed centrally of said marginal areas, said channel means being adapted for slidably receiving two parallel lateral edges of said transparency and including limit stop means comprising a pair of turned-up tabs located at an extremity of each of said channel means for establishing correct longitudinal alignment of leading asymmetric edges of said transparency with the central aperture of said supporting element aperture, the external height of said channel means above said supporting surface being greater than the internal spacing between said surface and said channel means, said retaining plate being formed of a substantially rigid material and comprising a plurality of connected, coplanar marginal areas corresponding to said marginal areas of said supporting element and including longitudinal marginal areas and end marginal areas connecting said longitudinal marginal areas providing a surfacee for supporting the opposite face of said transparency, one of said end marginal areas being angularly flared in the plane thereof to provide, when superposed with said flared area of the supporting element, means for manually manipulating said holder, an aperture formed centrally of said marginal areas and in register with the aperture of said supporting element when said flared areas are superposed, said longitudinal marginal areas of said retaining plate having substantially parallel lateral edges so spaced apart as to fit between said channel means when said element and plate are superposed, longitudinal flanges extending laterally from said longitudinal edges of said retaining plate for projecting into said channel means, said channel means being deformable outwardly from one another to permit introduction of said flanges into said channel means by pressing said retaining plate between said channel means toward said supporting element, the surfaces of said flanges which are contiguous said supporting element being coplanar with the supporting surface of said retaining plate, the thickness of said retaining plate with respect to that of said flanges and to the external height of said channel means being such as to place the exposed surface of said retaining plate approximately even with the top of said channel means.

11. A holder for use with an asymmetric photographic transparency as defined in claim 10 wherein said retaining plate is of a greater length than that of said mounting element whereby at least an end edge portion of said retaining plate extends beyond one end edge of said mounting element, said end edge portion of said retaining plate including a raised ridge on its inner surface for engaging said end edge of said mounting element and maintaining the relative longitudinal positions of said mounting element, retaining plate and a transparency located therebetween.

12. A holder for use with an asymmetric photographic transparency as defined in claim 11 wherein both end edge portions of said retaining plate extend beyond the end edges of said mounting element and include raised, inwardly projecting ridges for engaging the end edges of said mounting element and maintaining the relative longitudinal positions of said mounting element, retaining plate and a transparency located therebetween.

References Cited in the file of this patent
UNITED STATES PATENTS

| Number | Name | Date |
| --- | --- | --- |
| 1,633,376 | Freeman | June 21, 1927 |
| 2,153,149 | McHarg | Apr. 4, 1939 |
| 2,477,470 | Williams | July 26, 1949 |
| 2,490,058 | Jablon | Dec. 6, 1949 |
| 2,541,575 | Davidson | Feb. 13, 1951 |
| 2,719,791 | Land | Oct. 4, 1955 |
| 2,759,825 | Land | Aug. 21, 1956 |